United States Patent [19]
Li et al.

[11] Patent Number: 6,092,728
[45] Date of Patent: Jul. 25, 2000

[54] MINIATURE LASER DIODE FOCUSING MODULE USING MICRO-OPTICS

[75] Inventors: Yajun Li, Oakdale; Simon Bard, Setauket; Mark Krichever, Hauppage; Joseph Katz, Stoneybrook; Chin Tan, Centereach, all of N.Y.

[73] Assignee: Symbol Technologies, Inc., Holtsville, N.Y.

[21] Appl. No.: 09/352,542

[22] Filed: Jul. 12, 1999

Related U.S. Application Data

[60] Division of application No. 08/624,935, Mar. 22, 1996, abandoned, which is a continuation-in-part of application No. 08/173,255, Dec. 27, 1993, abandoned, which is a division of application No. 07/860,390, Mar. 30, 1992, abandoned.

[51] Int. Cl.$^7$ ..................................................... G06K 7/10
[52] U.S. Cl. ................ 235/454; 235/462.35; 235/462.42
[58] Field of Search .................... 235/462.32, 462.36, 235/462.35, 462.27, 462.38, 462.39, 462.4, 462.41, 462.42, 454; 359/986, 387

[56] References Cited

U.S. PATENT DOCUMENTS

| | | | |
|---|---|---|---|
| 3,704,949 | 12/1972 | Thomas et al. | 356/71 |
| 3,894,756 | 7/1975 | Ward | 283/7 |
| 3,957,353 | 5/1976 | Fienup et al. | 350/162 SF |

(List continued on next page.)

FOREIGN PATENT DOCUMENTS

| | | |
|---|---|---|
| 60-83074 | 5/1985 | Japan . |
| 62-283384 | 12/1987 | Japan . |
| 4-264582 | 9/1992 | Japan . |

OTHER PUBLICATIONS

Carts, "Micro-optics has macro potential," Laser Focus World, Jun. 1991.
Goodman, Introduction to Fourier Optics, Table of Contents, pp. 110–120, first ed. 1968, second ed. 1996.
Johnson et al., "Connectorized Optical Link Package Incorporating a Microlens," Proceedings of the 30th Electronics Components Conference, San Francisco, CA, Apr. 28–30, 1980.
Figiwara, "Optical properties of conic surfaces, I Reflecting Cone," J. Opt. Soc. Am., 52, 287–292 (1962).
Tsi et al., "System analysis of CCD–based bar code readers," Appl. Opt. 32, 3504–3512 (1993).
Behrmann et al., "Influence of temperature on diffractive lens performance," Appl. Opt. 32, 2483–2489.
R.J. Collier et al., Optical Holography, Academic Press, New York (1971), Chapter 16 "Information Storage," pp. 454–493.
H.J. Caulfield, Handbook of Optical Holography, Academic Press, New York (1979), Chapter 10.1 "Digital Data Storage," pp. 370–413.
J. Swartz, "Bar Codes and Other Technology Leaps," New York Times, Jun. 6, 1993, Long Island Section 10.
Zech, "Mass Storage Future Perfect?", Optics & Photonics News (Aug. 1992).
Wild et al., "Hole burning, Stark effect, and data storage," vol. 24, No. 10, (May 15, 1985).
Kohler et al., "Storage of 2000 Holograms in a Photochemical Hole–Burning System," Optics Letters, vol. 18, No. 24 (Dec. 15, 1993).

Primary Examiner—Thien M. Le
Attorney, Agent, or Firm—Fish & Richardson P.C.

[57] ABSTRACT

A miniature module emits and focuses a divergent light beam. The focusing module consists of a small-sized light emitter, such as a laser diode, and a micro-optical element seated in a lens holder. The outside diameter of the micro-optical element is 4 mm or less and preferably less than or equal to 2.5 mm. The micro-optical element may be a small conventional lens, a gradient index lens, or one of several types of diffractive optical element. The focal length of the module relative to the light from the emitter is set by sliding the lens holder along its central axis and permanently adhering it in place with respect to the emitter after focusing. During focal adjustment, axial rotation between the lens holder and between the base of the emitter is prevented by a series of notches. The miniature focusing module is smaller, lighter, costs less and may provide a larger relative aperture than the conventional structures currently used for example in solid state laser scanners.

21 Claims, 9 Drawing Sheets

U.S. PATENT DOCUMENTS

| | | | |
|---|---|---|---|
| 3,970,781 | 7/1976 | Dalton et al. | 178/7.6 |
| 4,041,279 | 8/1977 | Foote | 235/61.7 B |
| 4,108,367 | 8/1978 | Hannan | 235/457 |
| 4,150,781 | 4/1979 | Silverman et al. | 235/382 |
| 4,158,134 | 6/1979 | Martin et al. | 359/668 |
| 4,269,473 | 5/1981 | Flothman et al. | 350/3.61 |
| 4,289,372 | 9/1981 | Clay | 350/3.83 |
| 4,323,297 | 4/1982 | Kawamura et al. | 350/6.8 |
| 4,390,239 | 6/1983 | Huber | 359/446 |
| 4,563,024 | 1/1986 | Blyth | 283/91 |
| 4,563,056 | 1/1986 | Tagawa et al. | 350/6.8 |
| 4,568,141 | 2/1986 | Antes | 350/3.61 |
| 4,578,571 | 3/1986 | William | 235/462.22 |
| 4,641,017 | 2/1987 | Lopata | 235/457 |
| 4,676,599 | 6/1987 | Cruz | 350/252 |
| 4,684,795 | 8/1987 | Colgate, Jr. | 235/457 |
| 4,802,758 | 2/1989 | Fabbiani | 356/71 |
| 4,816,600 | 3/1989 | Swartz et al. | 235/457 |
| 4,820,006 | 4/1989 | Constant | 350/3.85 |
| 4,820,911 | 4/1989 | Arackellian et al. | 235/467 |
| 4,836,637 | 6/1989 | Poorman et al. | 350/96.21 |
| 4,873,426 | 10/1989 | Sarna et al. | 235/462 |
| 4,889,366 | 12/1989 | Fabbiani | 283/86 |
| 4,923,281 | 5/1990 | Krichever et al. | 350/245 |
| 4,945,215 | 7/1990 | Fukushima et al. | 235/457 |
| 4,953,188 | 8/1990 | Siegel et al. | 378/43 |
| 4,963,756 | 10/1990 | Quan et al. | 250/568 |
| 4,969,700 | 11/1990 | Haines | 350/3.66 |
| 4,988,154 | 1/1991 | Hansen | 350/3.86 |
| 5,028,102 | 7/1991 | Ogura et al. | 350/3.62 |
| 5,059,776 | 10/1991 | Antes | 235/457 |
| 5,073,041 | 12/1991 | Rastani | 385/33 |
| 5,095,194 | 3/1992 | Barbanell | 235/319 |
| 5,111,314 | 5/1992 | Leib | 359/29 |
| 5,138,468 | 8/1992 | Barbanell | 359/2 |
| 5,142,384 | 8/1992 | Wood et al. | 359/3 |
| 5,144,120 | 9/1992 | Krichever et al. | 235/472 |
| 5,145,212 | 9/1992 | Mallik | 283/86 |
| 5,148,317 | 9/1992 | Foresi | 359/742 |
| 5,164,584 | 11/1992 | Wike, Jr. et al. | 250/216 |
| 5,206,878 | 4/1993 | Sizer, II | 372/101 |
| 5,208,694 | 5/1993 | Tomita | 359/207 |
| 5,247,162 | 9/1993 | Swartz et al. | 235/467 |
| 5,285,438 | 2/1994 | Marchand | 369/103 |
| 5,289,299 | 2/1994 | Paek et al. | 359/29 |
| 5,289,407 | 2/1994 | Strickler et al. | 365/106 |
| 5,291,320 | 3/1994 | Paek | 359/28 |
| 5,300,764 | 4/1994 | Hoshino et al. | 235/487 |
| 5,306,899 | 4/1994 | Marom et al. | 235/382 |
| 5,319,476 | 6/1994 | Yamazaki et al. | 359/2 |
| 5,386,105 | 1/1995 | Quinn et al. | 235/462 |
| 5,422,744 | 6/1995 | Katz et al. | 359/2 |
| 5,426,520 | 6/1995 | Kakae et al. | 359/2 |
| 5,493,431 | 2/1996 | Baba et al. | 359/73 |
| 5,504,350 | 4/1996 | Ortyn | 257/81 |
| 5,572,368 | 11/1996 | Yokota et al. | 359/710 |
| 5,646,391 | 7/1997 | Forbes et al. | 235/462 |
| 5,683,748 | 11/1997 | Gunderson | 427/236 |
| 5,684,287 | 11/1997 | Walts | 235/462 |
| 5,684,290 | 11/1997 | Aracklian et al. | 235/472 |
| 5,751,475 | 5/1998 | Ishiwata et al. | 359/387 |
| 5,969,855 | 10/1999 | Ishiwata et al. | 359/386 |

PHASE CONTRAST PLATE

MINIATURE LASER DIODE FOCUSING MODULE USING MICRO-OPTICS

CROSS REFERENCE TO RELATED APPLICATIONS

The present application is a divisional of U.S. application Ser. No. 08/624,935, filed Mar. 22, 1996 now abandoned which is a continuation-in-part of U.S. application Ser. No. 08/173,255, filed Dec. 27, 1993 now abandoned, which is a divisional of U.S. application Ser. No. 07/860,390 now abandoned, filed Mar. 30, 1992. The two aforementioned applications are incorporated by reference herein in their entirety.

BACKGROUND OF THE INVENTION

The present invention relates to combined light emitter and focusing optics modules. Such modules, for example, can be used in scanners and the like for reading optically encoded information, such as bar codes.

A laser diode and focusing module will typically include a laser diode, at least one lens element for focusing light from the diode and means to fix the lens element at a desired distance from the laser diode so as to focus light from the diode at a point a predetermined distance in front of the module. Krichever et al., for example in their U.S. Pat. No. 4,923,281, teach telescoping two holding members of an emitting and focusing module against the force of a biasing spring positioned between the laser diode and the lens assembly to adjust the focusing of the light emitted by the module. One holding member is attached to the laser diode, and the other member holds the lens assembly for focusing the light from the laser diode. The second holder also provides an ellipsoidal aperture for the light passing through the lens. A series of notches and key elements prevents axial rotation between the cylindrical holders.

Laser diode and focusing modules may find use in a variety of light emitting devices. For example, such a module might be used in an optical pointer to allow a lecturer to produce a focused visible light beam spot on a screen or display to point out a particular feature for emphasis during the lecture. In such applications of the module, the larger the module, the larger and heavier the resulting device. Large size and weight of the device makes the device cumbersome and tiresome to use, particularly for protracted periods.

The presently preferred use of the laser diode and focusing module is as the emitting element of a device for reading optically encoded information, such as bar code symbols. To further emphasize problems relating to prior art module structures, the problems will be discussed in the context of bar code readers.

Bar code readers have become quite common because bar code reading type data input systems improve the efficiency and accuracy of data input for a wide variety of applications. The ease of data input in such systems facilitates more frequent and detailed data input, for example to provide efficient inventories, tracking of work in progress, etc. To achieve these advantages, however, users or employees must be willing to consistently use the bar code readers. The readers therefore must be easy and convenient to operate and must produce little or no fatigue or discomfort during protracted use.

To decode a bar code symbol and extract a legitimate message, a bar code reader scans the symbol to produce an analog electrical signal representative of the scanned symbol. A variety of scanning devices are known. The scanner could be a wand type reader including an emitter and a detector fixedly mounted in the wand, in which case the user manually moves the wand across the symbol.

Alternatively, an optical scanner scans a light beam such as a laser beam across the symbol, and a detector senses the light reflected from the symbol. In either case, the detector senses reflected light from a spot scanned across the symbol, and the detector provides the analog scan signal representing the encoded information.

In a wand type reader and in most scanners the light source or emitter generates a light beam which is optically modified to form a beam spot of a certain size at the working distance and is directed toward a bar code symbol located in the vicinity of the working distance for reflection from the symbol. In readers using a laser as the emitter, the emitter and the optical focusing components can all be elements of a single laser and focusing module of the type described above.

Wand type readers are held and manipulated by hand. Many specific applications for the bar code scanners require that the optical scanner also is constructed in the form of a handheld of hand mounted unit, so that the user points the scanner at the object and operates a trigger to activate the scanning of the beam across the bar code. In such handheld readers, the emitter, optical focusing element and housing of the emitter and focusing module constitute a substantial percentage of the weight and volume. If the emitter and focusing module is large and heavy, the hand operated bar code reader will also be large and heavy. Consequently, the reader will be cumbersome to operate and will produce operator fatigue when used for long periods. Difficult operation, fatigue and discomfort in use all discourage an operator from actually using the reader of the bar code data input system. Reluctance to consistently use the reader can defeat the purposes and advantages of bar code data entry.

Commonly assigned application Ser. No. 07/193,265 filed May 11, 1988, now U.S. Pat. No. 5,144,120, discloses a mirrorless optical scanner, and application Ser. No. 07/699, 417 filed on May 13, 1991 discloses incorporation of such a scanner in a modular scanner component system facilitating use of the scanner in a variety of different housing configurations. Several of the disclosed scanner configurations mount on the arm or hand of an operator. Commonly assigned application Ser. No. 07/787,458 filed on Nov. 4, 1991 discloses a scanner module for use in a ring mounted housing allowing the user to wear the scanner on a finger. The disclosure of each of these three copending applications is incorporated herein in its entirety by reference. To make the scanners worn on a hand, arm or finger practical, the light emitter and optics module used in such scanners must be extremely small. The conventional module package of a diameter=9.0 mm generally is too large for use in such scanners.

Furthermore, in many optical scanners, the laser beam is reflected back near the emitting and focusing module by the scanning mirror. To prevent the structure of the module from blocking or interfering with the path of the reflected beam dictates placement of the module at a point some distance below the path of the reflected beam. The larger the module, the larger the distance below the path of the reflected beam. The large distance below the path of the reflected beam results in a large incident angle between light from the laser emitter and the scanning mirror. A large incident angle, however, causes curvature distortion in the resultant scan line across the information surface. Such distortion complicates or prevents reading of truncated bar code symbols or two-dimensional symbols.

Typically, existing laser based bar code readers use a laser diode in a conventional module package of a diameter=9.0 mm. The larger diodes used in such modules, however, are more expensive than smaller laser diodes would be.

A need therefore exists to further reduce the size, weight and cost of the light emitter and focusing module for use in bar code readers and other devices which require an emitted beam of light.

SUMMARY OF THE INVENTION

An objective of the present invention is to reduce the size and weight of a light emitting and focusing module.

Another objective of the invention is to prevent rotation of the microlens and small laser diode of the emitting and focusing module relative to each other during focusing.

In a broad aspect, the invention is a miniature module for focusing a divergent light beam emitted from a source such as a laser diode. To achieve weight and size reduction, the invention uses a particularly small laser diode and a micro-optical element.

For purposes of this disclosure, the terms "micro-optics" and "micro-optical elements" encompass small conventional lenses, gradient index lenses, and diffractive optical elements such as holographic optical elements and binary optical elements, of 4 mm or less and preferably less than or equal to 2.5 mm. Thus, the micro-optical element can be a conventional lens of small diameter or a gradient index lens, i.e., a flat plate structure formed of a material so as to have a different index of refraction at different points along the plane of the lens. Alternatively, the micro-optical element can be a fresnel lens, a binary optic lens or a multi-level binary optical lens, any of which might be formed by lithographic processing.

In another aspect of the invention, the micro-optical element includes a lens surface which may be used to reshape light emitted from a laser diode such that the divergence of the light along one axis more closely matches the divergence of the light along a second axis.

In another aspect, the invention features a light focusing element in which a phase contrast plate is used, for example, in conjunction with a lens collimator to increase the working range of laser-based bar code scanners.

In one embodiment of the present invention, the manufacturer adjustably focuses the light from the laser diode by sliding the lens holder along its central axis relative to the laser diode. During focusing, axial rotation between the holders and between the base of the module is prevented by a series of notches and key elements. Once properly focused, the lens holder is permanently adhered in place with respect to the laser diode. Typically the lens diameter is 4 mm or less, for example 2.5 mm, however, future preferred embodiments will use lenses of still smaller diameters.

In a particular embodiment, the focusing module includes a small-sized laser diode, a diode holder, a spring and a microlens that is seated in a lens holder. Alternatively, the back face of the lens holder may conform to the cylindrical front section of the diode, and the diode holder and spring can be replaced with a bellows or an elastic and heat-conducting rubber ring.

A snap ring retains the lens within a seat or recess formed in the front of the lens holder. The snap ring can be removed, even after focusing, to readjust the position of the lens within the holder or to clear the lens. Alternatively, the lens holder could have a lip on the front of the lens seat deformed over the edge of the micro-optic lens to burnish the lens permanently in place in the holder.

The back face of the lens holder also includes a small opening through which the laser light passes before entering the lens. The small opening serves as the aperture of the module. As a result of this construction, the aperture is behind the lens, instead of in front of the lens, as in the prior art Krichever et al. patent. The aperture can have a number of different geometric shapes. The aperture can be circular or can comprise a rectangular slit. Also, the aperture can be oval or can have a football shape. To produce a module having a desired aperture shape and size requires only selecting a lens holder with the desired aperture before assembly of the module. If the aperture is rectangular, oval or football shaped, the long or "major" axis of the aperture is aligned with the long axis of the elliptical cross section of the emitted laser light beam.

The miniature emitting and focusing module exhibits several further advantages. For example, the miniature module may provide a larger relative aperture than the conventional structures currently used in solid state laser scanners.

In the typical optical scanner, the laser beam is reflected back near the emitting and focusing module by the scanning mirror. The reduction of size of the emitter and focusing module, provided by the present invention, allows placement of the module more closely to the optical axis of the scan mirror, without the structure of the module interfering with the reflected beam. This placement reduces the incident angle between the laser beam and the mirror. A smaller incident angle reduces curvature distortion in a scan line over the bar code symbol. Small curvature distortion makes the focusing modules proposed in this disclosure applicable to reading of truncated bar codes and to reading of two-dimensional symbols.

The emitter and micro-optic focusing module has a very simple structure and can be optimized for extremely small scanner units. The reduction of size and weight of the emitter and focusing module is a necessary condition to practical use of a laser diode focusing module in ring scanners or wand readers, as mentioned above. Also, the provision of the aperture as part of the lens holder allows selection of the aperture size and shape to best suit a particular scanning application.

The present invention also discloses a novel arrangement for housing a laser diode and a focusing plano-convex lens wherein the convex surface of the lens faces the laser diode. This arrangement advantageously minimizes errors due to variations in the thickness of the lens.

It should be noted further that laser diodes in a compact package (diameter≦5.6 mm) are typically less expensive than are the laser diodes in conventional packages (diameter=9.0 mm), which are commonly used in existing laser-based bar code readers. Therefore, there is an obvious performance/cost advantage in applying the small focusing modules to different devices utilizing focused laser beams.

Although intended for use principally in wand or scanner type bar code readers, the micro-optical focusing modules of the present invention have other uses. For example, the device could be used in an optical pointer to allow a lecturer to produce a focused visible light beam spot on a screen or display to point out a particular feature for emphasis during the lecture.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DESCRIPTION OF THE PREFERRED EMBODIMENTS

Figure 1A:
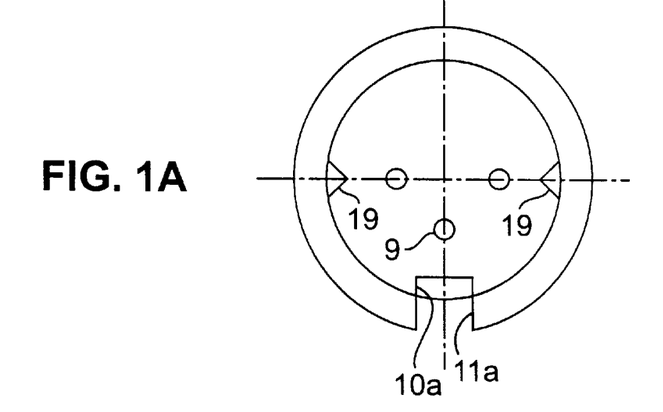
FIGS. 1A to 1C provide different views illustrating the structure of a miniature focusing module of the first embodiment of the present invention.
Figure 1B:
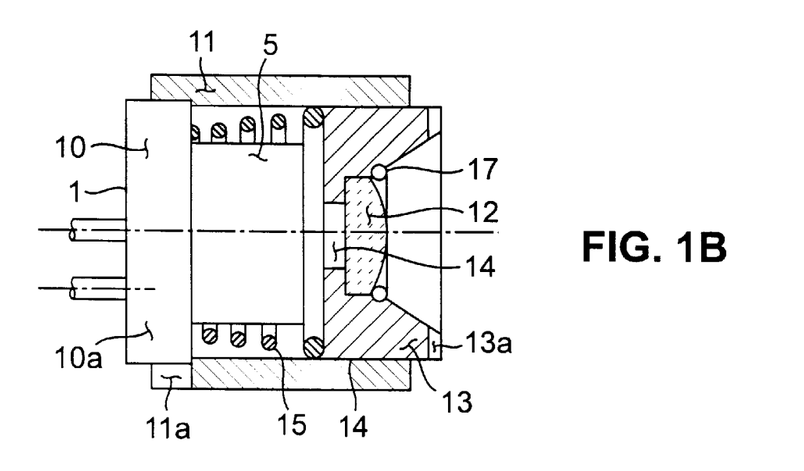

As shown in cross section FIG. 1B, the miniature focusing module of the first embodiment includes a small sized laser diode 1 which is commercially available, e.g., SONY SLD1101VS and TOSHIBA TOLD9211M. The remainder of the miniature focusing module of the first embodiment is mounted on the base 10 of the small-sized laser diode 1. In this embodiment, the base 10 of laser diode 1 is seated in laser holder 11, which typically is formed of brass. The brass of the laser holder 11 will serve as a heat sink to dissipate heat generated by the laser diode 1.

A snap ring 17 retains a micro-optical element 12 in the lens seat formed in the front of the lens holder 13. Typically, the lens holder 13 is brass, and the snap ring 17 is stainless steel. The snap ring can be removed, even after focusing, to readjust the position of the lens within the holder or to clear the lens. As discussed below, the micro-optical element is a microlens of relatively conventional shape, a gradient index lens, or one of the various types of diffractive optical elements.

The back face of the lens holder 13 includes a small opening 14 through which the light from laser diode 1 passes before entering the micro-optical element 12. The small opening 14 serves as the aperture of the module. As shown in FIG. 1B, the aperture 14 is behind the micro-optical element 12.

A spring 15 surrounds the cylindrical fore end portion 5 of the laser diode 1 and is located between the base 10 of the diode 1 and the rear face of the lens holder 13. Spring 15 exerts a separating force between the diode base 10 and the lens holder 13 such that the holder 13 is urged forward relative to diode 1.

Figure 1C:
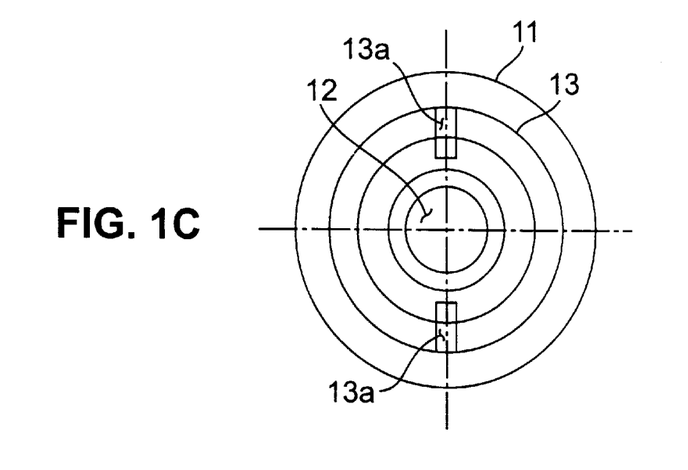

The outer diameter of the lens holder 13 is slightly smaller than the inside diameter of the fore end portion of the laser diode holder 11. Thus the two holders telescope together to allow adjustment of the length of the module. Sliding or telescoping the lens holder 13 relative to laser diode holder 11 changes the position of the micro-optical element relative to the laser diode 1, and thereby adjusts the focusing characteristics of the module. As the lens holder 13 slides backward toward base the of the laser diode 1 during focusing, the spring 15 compresses:

A notch or keyway 10a is formed in the base 10 of laser diode 1. The notch or keyway 10a on the base 10 of the laser diode 1 is aligned with the ground lead g, as shown in FIG. 1A, and with the long axis of the elliptical emission pattern of the laser diode. Notch or keyway 11a is formed in the laser diode holder 11 and aligned with the notch 10a in diode base 10 (FIGS. 1A and 1B). Notches or keyways 13a are also formed in the 11 front surface of the lens holder 13, as shown in FIG. 1C. During actual focusing, the focusing module assembly is held in a jig which includes key or chuck elements to engage each notch or keyway. The mechanical engagement prevents rotation during sliding of the components relative to each other.

As soon as the desired focus is achieved, the two holders are permanently fixed relative to one another by using adhesives such as glue or epoxy, or by fastening such as by staking, spot-welding, ultrasonic welding, or the like. The laser diode 1 also has one or more slots 19 formed in the base 10. The slots 19 each form a small passage between the base 10 and the surrounding portion of the laser diode holder 11. When using an adhesive to fix the positional relationship of holders 11 and 13, the adhesive will be injected through the angular slots 19 in the base 10 of the laser diode 1. It also is possible to engage the angular slots 19, together with the notch or keyway 10a, during focusing to further prevent rotational movement of the laser diode.

Figure 2A:
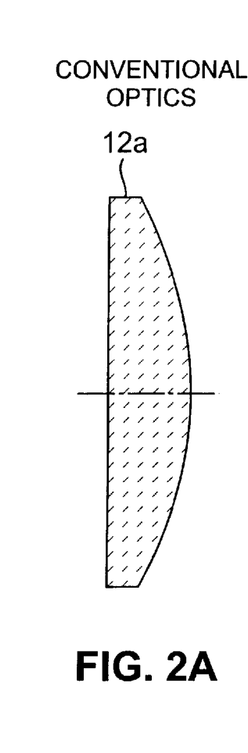
FIGS. 2A to 2E illustrate in cross section five different micro-optic lenses which can be used as the focusing element in the different embodiments of the present invention.

FIGS. 2A to 2E illustrate different examples micro-optic lens elements used as the focusing element, in the embodiment of FIGS. 1A–1C and in the embodiments of FIGS. 3 and 4 discussed below. FIG. 2A shows a small conventional lens, or "microlens" 12a, of 4 mm or less. The microlens 12a has a flat rear surface and a convex front surface. The refractive index n of the material of microlens 12a is constant throughout the entire lens, however, because of its shape the lens focuses light passing therethrough. One example of a commercially available lens used during testing had a 2.5 mm outer diameter, but to the extent feasible smaller lenses are preferred.

Small conventional lenses, however, have drawbacks. Each such lens must be ground and polished to the correct shape. This processing makes small lenses of this type expensive, and as a practical matter it is difficult to form such lenses much smaller than 2.5 mm in outside diameter. For these reasons, as smaller modules are produced it becomes necessary to use alternate micro-optical elements, such as those discussed below.

Figure 2B:
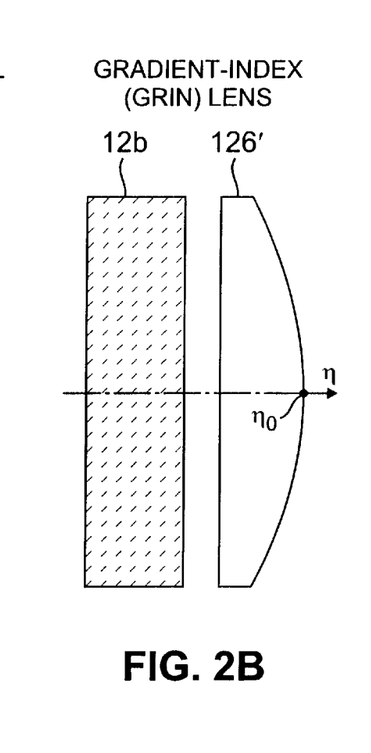

In a first alternative, the micro-optical element 12 could comprise a gradient index lens, i.e. a flat plate structure formed of a material so as to have a different index of refraction at different points along the plane of the lens. The gradient index lens 12b illustrated in FIG. 2B is doped with appropriate impurities to modify the refractive index so that the refractive index is different at different points along the plane of the lens. For purposes of the present invention, the impurity concentration is distributed across the plane of the lens 12b, so that the refractive index varies in such a manner as to produce an optical characteristic essentially the same as that of the conventional lens 12, as shown by the phantom illustration 12b' in FIG. 2B.

Figure 2C:
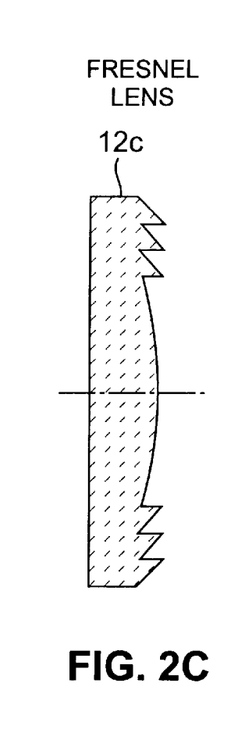
Figure 2D:
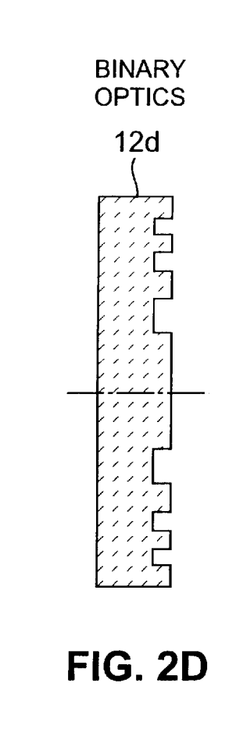
Figure 2E:
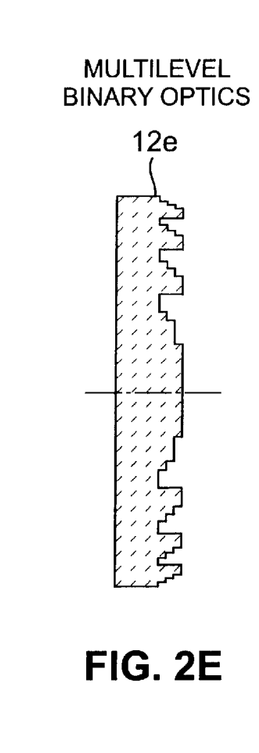

The present invention can also use several other types of micro-optical element; for example, any one of several types of diffractive elements could serve as the micro-optical element 12 in each embodiment of the invention. FIG. 2C shows a fresnel lens 12c, FIG. 2D shows a binary optic lens 12d, and FIG. 2E shows a multi-level binary optical lens 12e. The front surface of the lenses 12c, 12d, and 12e are contoured such that diffraction of light passing through those lenses will focus the light in essentially the same manner as would the conventional lens 12a.

The impurity doping used to form the gradient index lenses and the photolithography used to produce the diffractive fresnel, binary and multi-level binary type lenses are essentially the same as manufacturing 5 techniques developed to produce semiconductor devices. Consequently, these types of alternate micro-optical elements each can be mass produced at extremely low cost. Also, it is possible to produce such alternate micro-optical elements with much smaller diameters than the conventional lenses. Yvonne A. Carts, "Micro-optics has Macro Potential," *Laser Focus World*, June 1991, pp. 93–99, provides a detailed description of the state of the art in micro-optical lens elements.

Figure 2F:
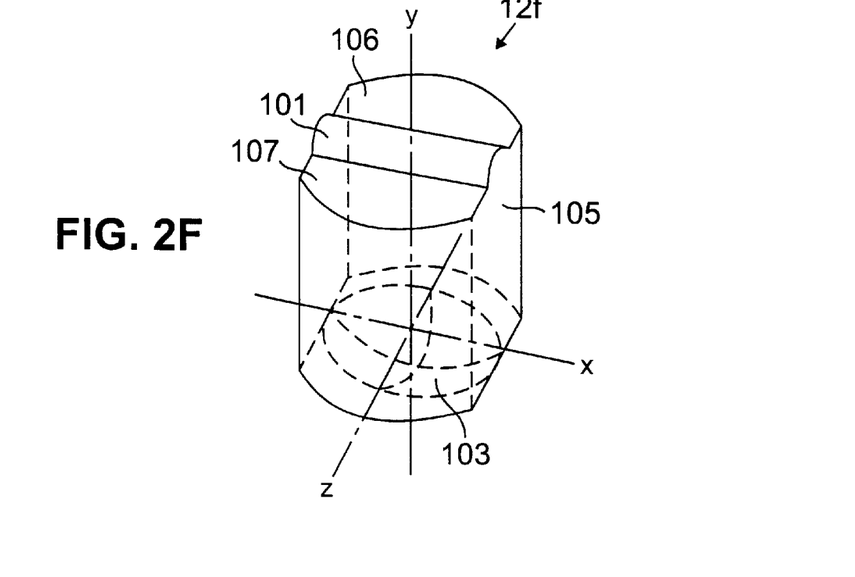
FIGS. 2F to 2K illustrate additional micro-optic lenses which can be used as the focusing element in various embodiments of the present invention.
Figure 2G:
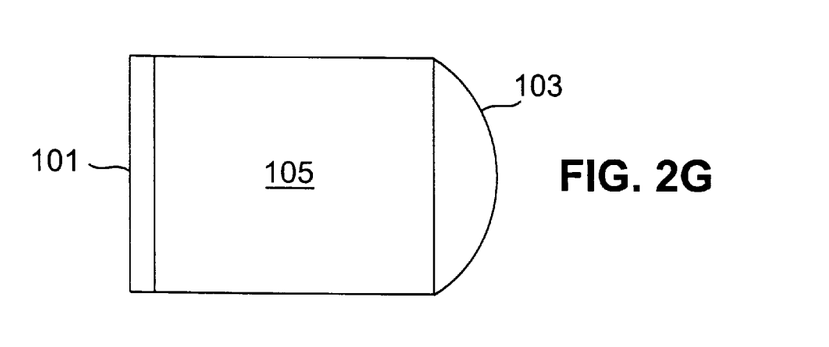
Figure 2H:
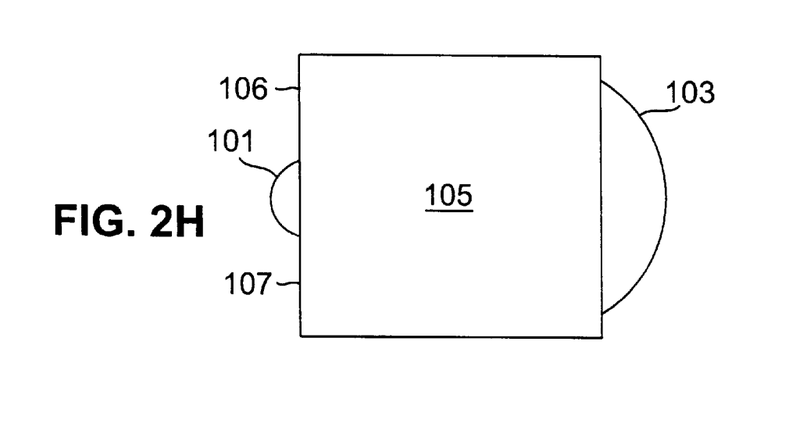

FIG. 2F illustrates a beam-shaping lens 12f which may be used as the micro-optical element 12 and which is particularly useful for reshaping laser beams having long elliptical profiles. The lens 12f is thus suitable, for example, where the laser diode 1 is a double-heterostructure diode. The lens 12f, which may be made of plastic, includes a plastic rod-shaped portion 105. The lens 12f preferably changes the divergence of the light along one axis to more closely match the divergence of the light along a second axis. For this purpose, a first lens surface 101 is provided so as to reduce the beam divergence in the direction normal to the diode junction preferably to the same degree as in the parallel direction. In one embodiment, the surface 101 is cylindrical and sits atop planar surfaces 106, 107 of the plastic rod-shaped portion 105. A spherical surface 103 is preferably provided at the end of the plastic rod 105 opposite the cylindrical surface 101. FIGS. 2G and 2H show cross-sections of the lens 12f in the x–y and y–z planes, respectively. The lens 12f is positioned such that light emitted from the laser diode 1 passes through both the cylindrical and spherical surfaces 101, 103. Preferably, the lens 12f is held in place by the lens holder 13 such that a laser beam from the diode 1 is first focused by the cylindrical surface 101. Advantageously, a more circular laser beam results after the original beam passes through the cylindrical surface 101 of the lens 12f, thereby increasing the concentration of power of the laser beam. When the resulting beam laser subsequently passes through the spherical surface 103, a more narrow laser beam is obtained. The lens 12f may further comprise one or more notches or keyways to maintain the lens 12f in the proper direction during assembly.

Figure 2I:
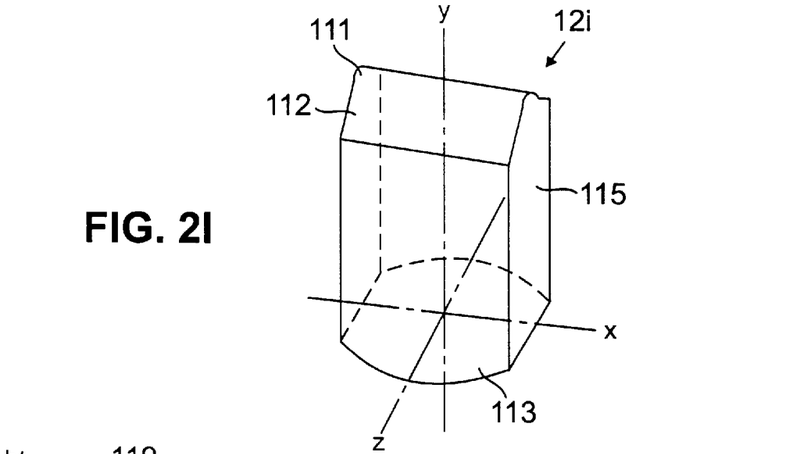
Figure 2J:
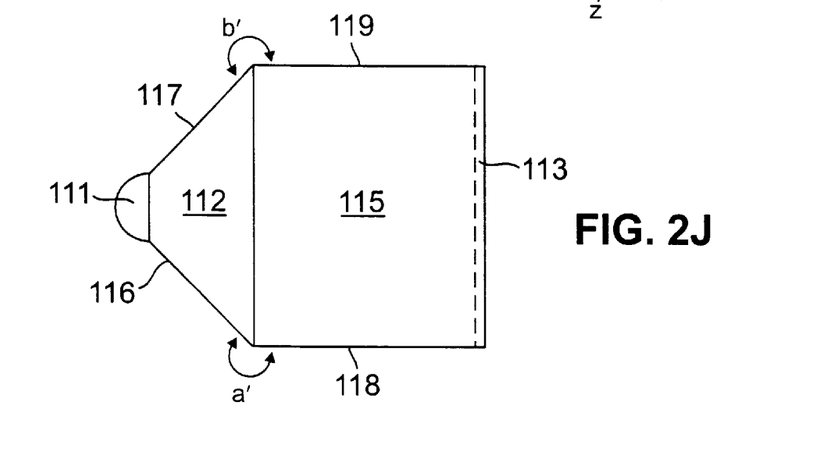

FIG. 2I illustrates a second embodiment of a beam-shaping lens 12i which may be used as the micro-optical element 12 and which is also useful for reshaping laser beams having long elliptical profiles. The lens 12f is thus also suitable where the laser diode 1 is a double-heterostructure diode. The lens 12i includes a first lens surface 111 which preferably changes the divergence of the light along one axis to more closely match the divergence of the light along a second axis, for example, by reducing the beam divergence in the direction normal to the diode junction to the same degree as in the parallel direction. The surface 111, which may also be cylindrical and made of plastic, preferably is connected to a plastic rod-shaped portion 115 of the lens 12i by a central or connecting portion 112 of the lens 12i. The connecting portion 112 is preferably trapezoid-shaped and includes outer surfaces 116, 117 which are inclined at an angle and connect surfaces 118, 119 of the rod-shaped portion 115 to the cylindrical surface 111. FIG. 2J shows a cross-section of the lens 12i in the y–z plane, from which it can be seen that the outer surfaces 116, 117 of the connecting portion 112 form respective exterior angles a' and b' with the outer surfaces 118, 119 of the rod-shaped portion 115, such that the angles a' and b' are greater than 180 degrees and less than 270 degrees. The connecting portion 112 of the lens 12i provides ease of manufacture and can reduce manufacturing costs. Furthermore, the surfaces 116, 117 can advantageously serve as an extension of the cylindrical surface 111 to further reduce refraction of a laser beam focussed by the lens 12i. This is particularly useful, for example, when the light beam extends beyond the cylindrical surface 111 due to the size of the light beam or the tolerances of the system.

At the opposite end of the rod 115, a diffractive element 113 is preferably provided to improve the longitudinal spherical aberration. The resulting longitudinal spherical aberration preferably elongates the depth of the focused field of the output laser beam, thereby increasing the working range of the bar code scanner. The lens 12i may also comprise one or more notches or keyways 117 to maintain the lens 12i in the proper direction during assembly.

Figure 2K:
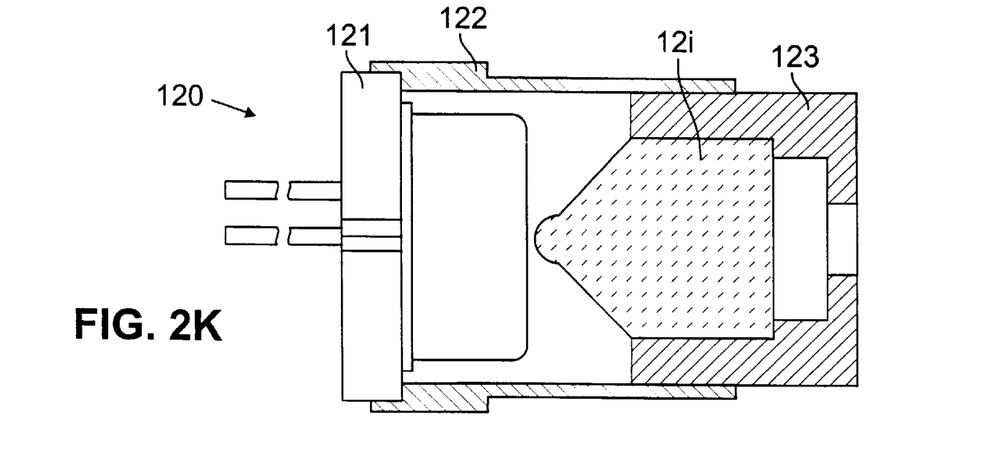

The lenses 12f and 12i can, therefore, be advantageously employed in the laser diode focusing module of the present invention to obtain a more powerful long narrow laser beam which is particularly useful for bar code scanning. These lenses can also be used, for example, in known laser diode focusing modules, such as the module disclosed in the aforementioned U.S. Pat. No. 4,923,281 to Krichever et al., which is incorporated by reference herein. FIG. 2K illustrates an exemplary laser diode focusing module 120 incorporating the beam-shaping lens 12i. The module 120 comprises a laser diode 121, a laser holder 122, and a lens holder 123 which holds the lens 12i in place and which is pressed during focusing. In general, the lenses 12f and 12i may be used in conjunction with relatively inexpensive, low-power laser diodes in place of more expensive, higher power laser diodes which would otherwise be required.

Figure 2L:
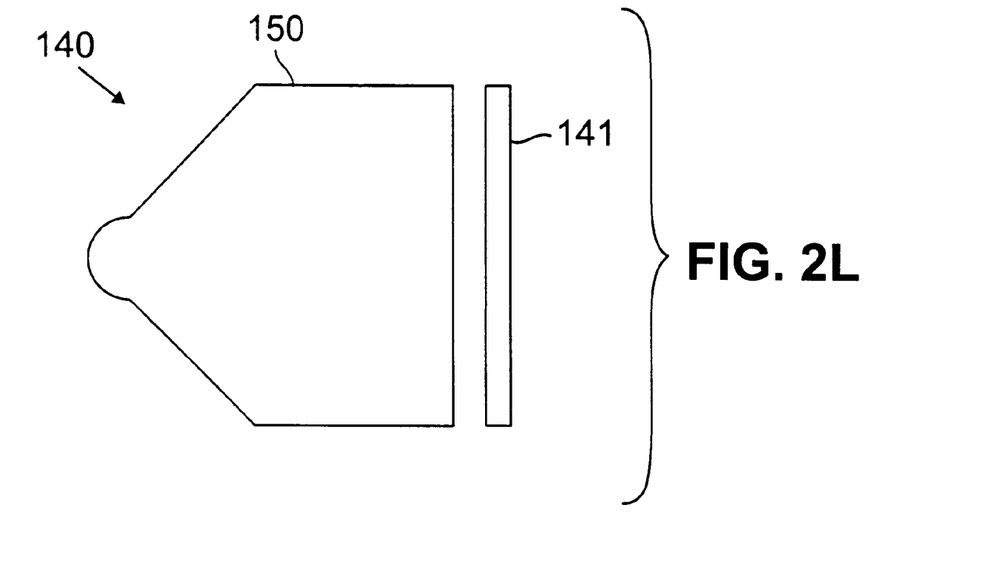
FIGS. 2L and 2M illustrate a combined lens collimator and phase contrast plate which can be used as the focusing module of the present invention.
Figure 2M:
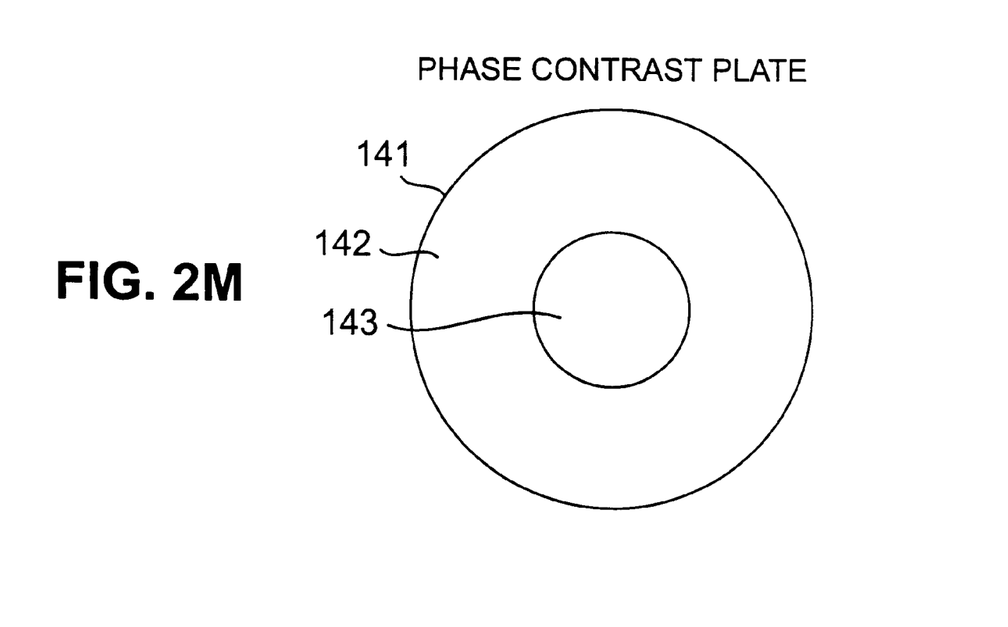

FIG. 2L illustrates an apparatus 140 which can be introduced as the focusing module of a laser-based bar code scanner to increase the working range or focal depth of the scanner. Specifically, the apparatus 140 comprises a phase contrast plate 141 placed in front of a lens collimator 150. The beam-shaping lens 12i, for example, may suitably be used as the lens collimator 150. FIG. 2M shows a cross-section of the phase contrast plate 141 taken perpendicular to the direction of the beam having a particular wavelength. The plate 141, which has a central region 143 and an outer region 142, is preferably formed by optical coating on a circular optically flat plate. The central and outer regions 142, 143 are preferably coated with respective optical transmission coatings such that the phase delays of the two regions are matched, in other words, such that preferably $$\alpha_Z - \alpha_O = -\pi$$

where $\alpha_Z$ is the phase delay of light from a light emitting element passing through the central region 143 and $\alpha_O$ is the phase delay of light from the light emitting element passing through the outer region 142. In addition, the optical coating of the outer region 142 preferably has a transmittance of absolute value less than one, for example, 0.1

The apparatus 140 comprising the lens collimator 150 and the phase contrast plate 141 shown in FIGS. 2L and 2M is particularly useful for generating truncated $J_0$ Bessel beams which may be employed advantageously in bar code scanners to decode distant bar code symbols using a light beam emitted, for example, from a laser diode. In addition, the apparatus 140 can be manufactured at a lower cost than existing focusing modules such as focusing modules utilizing a LORAX beam.

Figure 3:
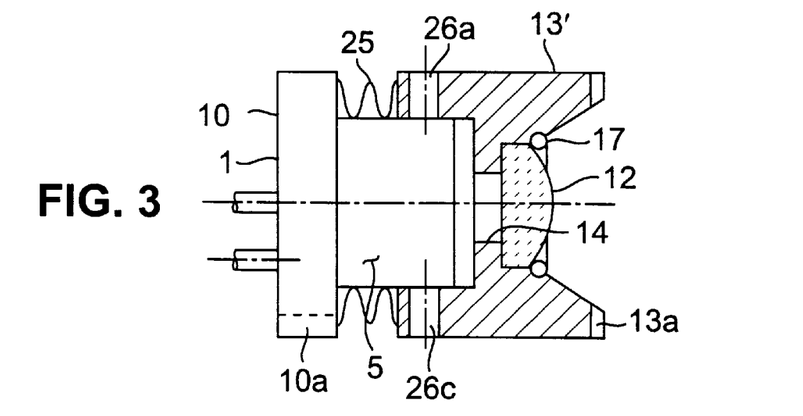
FIG. 3 illustrates in cross section the structure of a miniature focusing module of the second embodiment of the present invention.

FIG. 3 shows a simplified structure of the miniature focusing module shown in FIG. 1. In the module of FIG. 3, the laser holder and spring of FIG. 1 are replaced by a single component, bellows 25. Specifically, the bellows 25 is preferably disposed between the base portion of the laser diode 1 and the mounting arrangement and forms a chamber in which the fore-end portion of the laser diode 1 is disposed. The rear of the lens holder 13' has a cylindrical indentation conforming to but slightly larger than the outer diameter of the front cylindrical section 5 of the laser diode 1. This cylindrical indentation guides the laser diode 1 relative to the lens holder 13 during focusing. Also, openings 26a and 26c pass through the wall of the lens holder 13'.

During focusing of the second embodiment, the keys in the laser diode base and in the lens holder are again engaged to prevent rotation. The lens holder 13, is positioned relative to the laser diode 1 to provide the requisite focusing. The bellows 25, formed of stainless steel, compresses or expands between the diode base 10 and the lens holder 13' as needed until desired module focusing is achieved. Once focused, glue can be injected through holes 26a and 26c to permanently set the relative positions of the laser diode 1 and the lens holder 13' and thereby set the focal length of the assembly.

Figure 4:
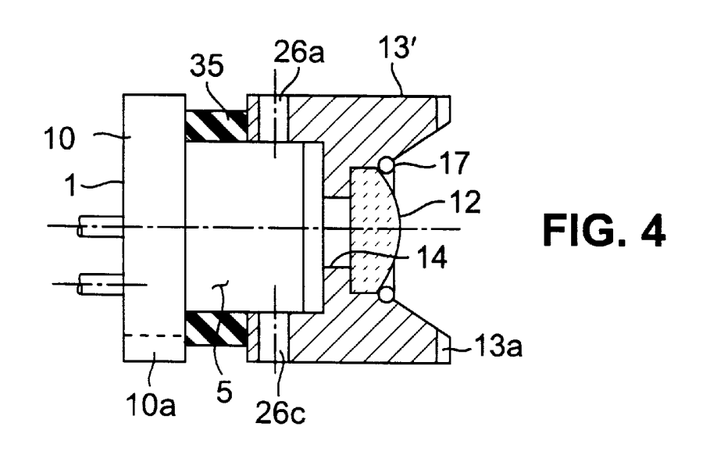
FIG. 4 illustrates in cross section the structure of a miniature focusing module of the third embodiment of the present invention.

FIG. 4 shows a structure similar to FIG. 3, except that the bellows shown in FIG. 2 is replaced by an elastic and heat-conducting rubber ring 35. The elastic member 35 is preferably disposed between the base portion of the laser diode and the mounting arrangement and has a cavity in which the fore-end portion of the laser diode 1 is disposed. Focusing of this embodiment is similar to that of the FIG. 2 embodiment, with the elastic and heat-conducting rubber ring 35 expanding and compressing as necessary until the lens holder 13' is positioned relative to the laser diode 1 to provide the requisite focusing. The embodiment of FIG. 4 is also advantageous because the heat conducting rubber ring 35 serves as a heat sink to dissipate energy generated by the laser diode 1.

Figure 5:
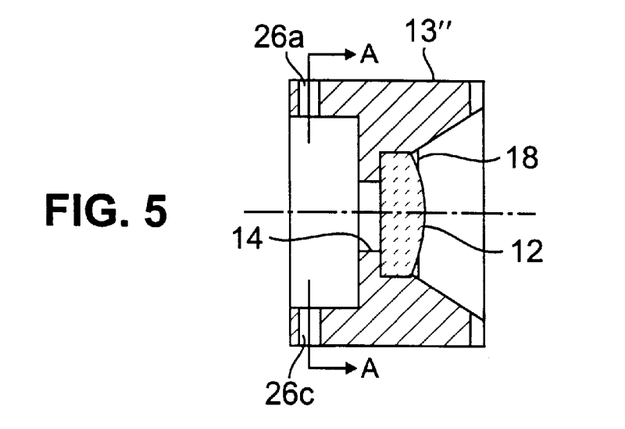
FIG. 5 illustrates in cross section the lens holder using an alternate lens retaining structure.

FIG. 5 is a detailed cross sectional illustration of an alternate embodiment of the lens holder of the present invention using a different structure to retain the micro-optical element 12 in the lens seat. In place of the snap ring used in the earlier embodiments, a lip portion 18 of the front edge of the seat in lens holder 13" is deformed over the edge of the lens to retain the lens. The lip 18 thus serves to burnish the lens into the seat in the front of the holder 13".

Figure 6A:
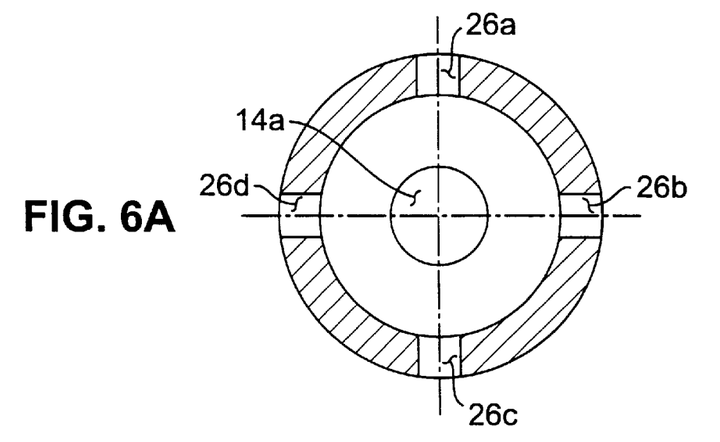
FIGS. 6A to 6D are views taken in cross section along line A—A in FIG. 5 and serve to illustrate the different apertures shapes which may be provided in the lens holder.
Figure 6B:
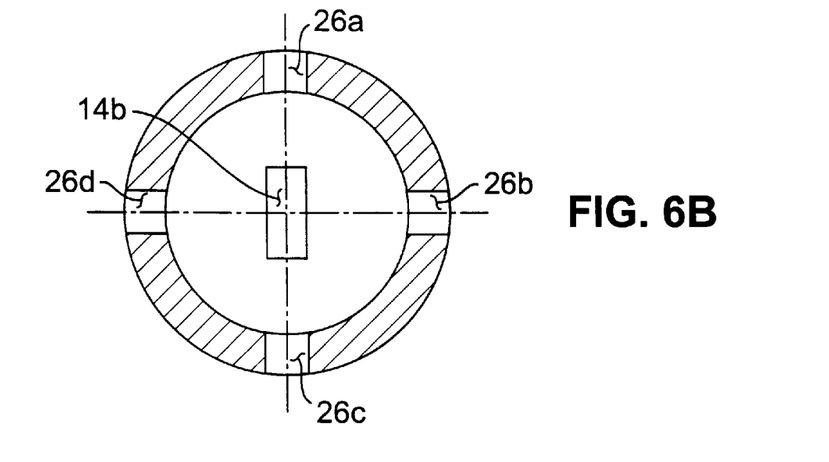
Figure 6C:
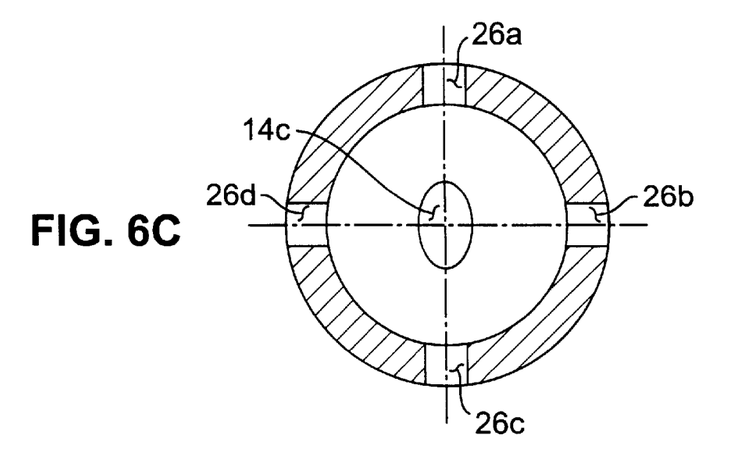
Figure 6D:
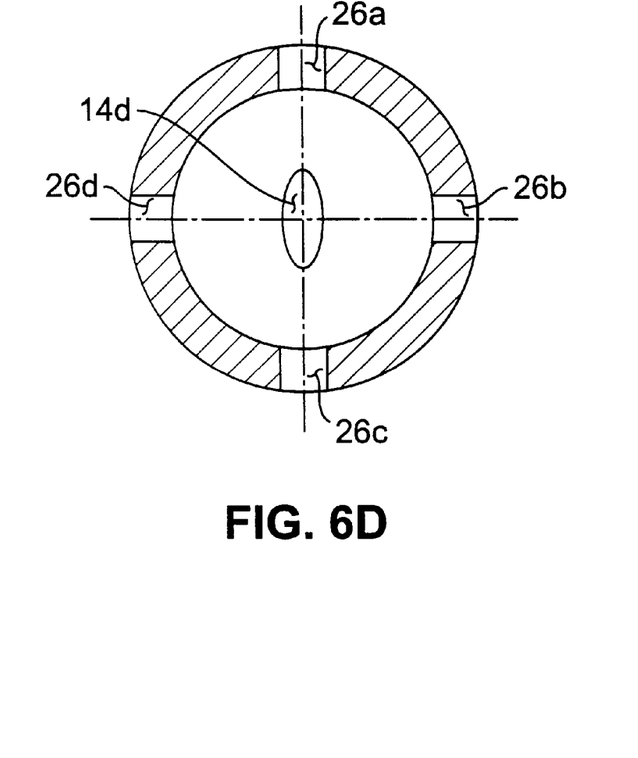

As shown in FIG. 5, the aperture 14 is behind the micro-optical element 12. A number of different lens holders can be constructed to provide apertures having a number of different geometric shapes, as shown in FIGS. 6A to 6D. FIG. 6A shows a lens holder having a circular aperture 14a. Alternately, the lens holder can comprise a rectangular slit 14b. Furthermore, the aperture can be oval, as shown at 14c in FIG. 6C, or can have a football shape, as shown at 14d in FIG. 6D. For any selected aperture shape, it is also possible to vary the dimensions of the aperture. The size and shape of the aperture limit the amount of light emitted by the module. It is therefore a relatively simple matter to design the focusing module for a particular application by substituting a lens holder having a different sized and/or shaped aperture, prior to focal length adjustment of the module.

Although FIGS. 3–5 show a conventional lens 12 as the micro-optical element, each of the alternative elements 12b–12i shown in FIGS. 2B–2K and the can be substituted for the conventional lens.

The laser diode used at this time is a SONY SLD1101VS, originally developed for small, portable compact disc players. The base 10 of this diode is 5.6 mm in diameter, and the cylindrical fore end section 5 is 3.7 mm in diameter, maximum. Still smaller laser diodes, however, are preferred.

In the illustrated embodiments of FIGS. 1 and 3–5, the micro-optical element is a conventional lens of micro size, typically less than 4 mm in diameter. One commercially available lens used in prototype testing of the invention is an Edmund R43,399 Micro-Lens formed of glass LaSFN850322. This lens is 2.5 mm in diameter, has a planar rear surface and a convex front surface having a 2.12 mm curvature. Using a laser diode having a beam wavelength of 670 rim, the index of refraction of the lens glass is 1.8414, and the focal length of the lens is 2.52 mm. The principal point within the lens is 0.435 mm in front of the planar rear surface.

To adjust the module to produce a working range of 200 mm (plus or minus 100 mm) the distance from the laser diode chip, within the laser housing, should be 2.56 mm. Since the position of the chip within the housing is known from the manufacturer's specifications it becomes possible to determine the optimum adjustment and resulting dimensions for the micro-optics focusing module. For a 2.5 mm diameter lens, the lens holder might have an outer diameter of 5.0 mm. Using the exemplary laser diode and available microlens, the embodiment of FIG. 1 would result in a module having an overall length from the rear surface of the base 10 of the laser diode to the front surface of the lens holder 13 of 6.5 mm. The embodiments of FIGS. 3 and 4 would result in a module having an overall length from the rear surface of the base 10 of the laser diode to the front surface of the lens holder 13' of 6.0 mm.

Figure 7:
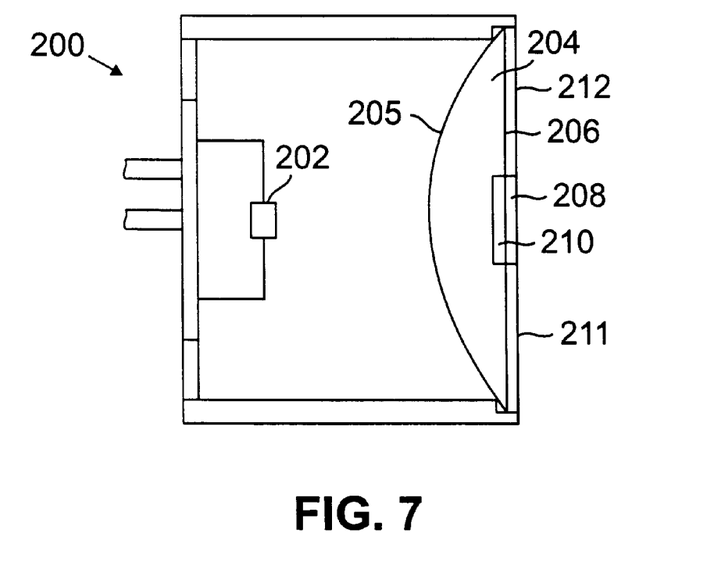
FIG. 7 illustrates a further embodiment of the structure of a laser diode package according to the present invention.

FIG. 7 shows a further embodiment of a novel structure of a laser diode package 200 for housing a laser diode 202 and a micro-optical focusing element, such as lens 204. As illustrated in FIG. 7, the lens 204 is suitably a plano-convex focusing lens with the convex surface 205 of the lens facing the laser diode 202 so that light emitted from the diode 202 initially passes through and is focused by the convex surface 205 of the lens 204. This configuration minimizes errors due to variations in the thickness of the lens 204. Aberration of the lens 204 can be corrected, for example, by a small aperture 208 on the plano surface 206 of the lens 204. The walls 211 and 212 of the package 200 adjacent the aperture 208 also function to secure the lens 204 in place. A diffractive optical element 210 is preferably integrated on the plano surface 206 of the lens 204 to account for variations in temperature, which may be significant, for example, where a plastic material is used for the lens 204. The diffractive optical element 210 can also function to correct the aberration of the lens. Preferably, the thickness of the lens 204 varies only in the radial direction, such that the thickness of the lens 204 is axial symmetrical to minimize the effects of linear thermal expansion.

The structure illustrated in FIG. 7 is intended to improve the focusing capabilities of laser diode focusing modules, particularly when used in conjunction with known precision placement techniques for controlling the placement of the laser diode in the package and known lens fabrication techniques for controlling the curvature of the lens. The improved focusing which can be achieved with the structure shown in FIG. 7 is particularly advantageous for typical bar code scanning applications in which the laser beam must be focused to within ±10 μm.

Figure 8:
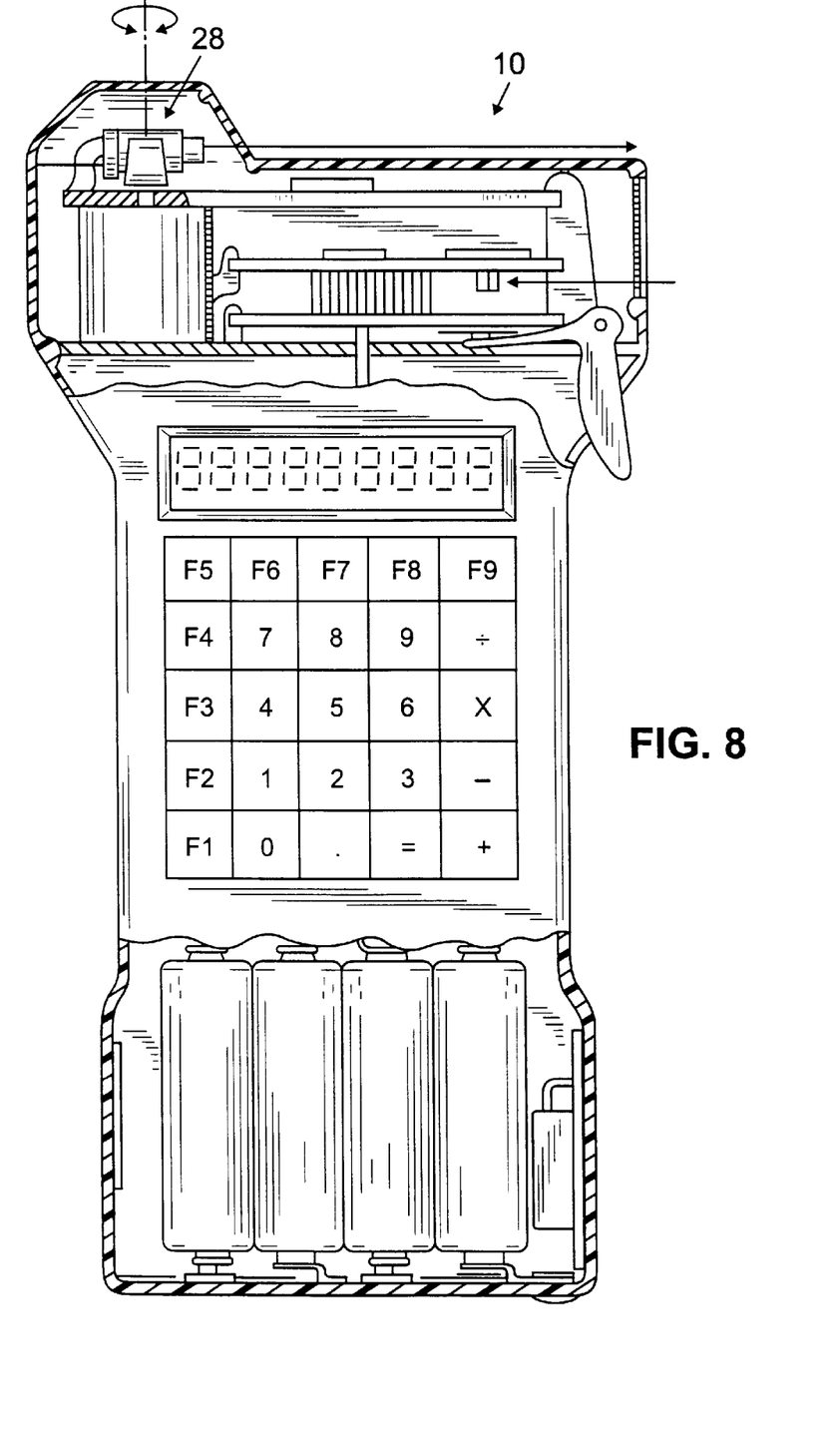
FIG. 8 is a partly broken away, partly sectioned side view of a handheld light scanning system incorporating a light focusing and emitting module in accordance with the present invention.

FIG. 8 depicts a mirrorless scanning arrangement 110 of the type disclosed and described in detail in U.S. Pat. No. 5,144,120, incorporated by reference above. The illustrated scanner 110 is intended as exemplary of optical scanners which may include a subassembly 28 in the form of one of the light emitting and focusing modules described above with regard to the earlier drawings.

Other embodiments are within the scope of the invention. What is claimed is:

1. Light emitting and focusing elements for an optical scanner of the type used for scanning optical indicia such as bar codes, the light emitting and shaping elements comprising:

a light emitting element;

one or more light focusing elements for focusing light emitted from the light emitting element, the focusing elements comprising a phase contrast plate positioned generally perpendicularly to the path of light emitted from the light emitting element, wherein the phase contrast plate has at least a first region and a second region, and wherein the phase delay of light passing through the first region differs from the phase delay of light passing through the second region.

2. The light emitting and focusing elements of claim 1 incorporated in an optical scanner of the type used for scanning optical indicia such as bar codes.

3. The light emitting and focusing elements of claim 1 wherein the light emitting and one or more light focusing elements are mounted in a module.

4. The light emitting and focusing elements of claim 1 further comprising a lens collimator.

5. The optical scanner of claim 4 wherein the phase contrast plate is placed in front of the lens collimator.

6. The light emitting and focusing elements of claim 1 wherein the light emitted from the light emitting element generally follows a longitudinal axis, and wherein the first region of the phase contrast plate is closer to the longitudinal axis than the second region, and the second region surrounds the first region.

7. The light emitting and focusing elements of claim 6 wherein the phase delay of light passing through the first and second regions differ by $\pi$.

8. The light emitting and focusing elements of claim 6 wherein the phase delay of the first and second region are matched.

9. The light emitting and focusing elements of claim 7 wherein the elements are configured to generate truncated $J_0$ Bessel beams for scanning distant optical indicia.

10. The light emitting and focusing elements of claim 6 wherein the phase delay of light passing through the first and second regions differ such that $\alpha_Z - \alpha_O = -\pi$, where $\alpha_Z$ is the phase delay of light passing through the first region and $\alpha_O$ is the phase delay of light passing through the second region.

11. The light emitting and focusing elements of claim 10 wherein the light emitted from the light emitting element generally follows a longitudinal axis, and wherein the first region of the phase contrast plate is closer to the longitudinal axis than the second region, and the second region surrounds the first region.

12. The light emitting and focusing elements of claim 6 Wherein the phase contrast plate is an optically flat plate with one or more optical coating that provides the different phase delays in the first and second regions.

13. The light emitting and focusing elements of claim 12 wherein the optical coating of the second region has a transmittance of absolute value less than one.

14. The light emitting and focusing elements of claim 1 wherein the phase contrast plate is configured to provide an increased working range for the optical scanner.

15. The light emitting and focusing elements of claim 14 wherein the light emitting element generates a laser beam.

16. The light emitting and focusing elements of claim 15 wherein the light emitting element comprises a laser diode.

17. An optical scanner of the type used for scanning optical indicia such as bar codes, the optical scanner comprising:

a light emitting element;

one or more light focusing elements for focusing light emitted from the light emitting element, the focusing elements comprising a phase contrast plate positioned generally perpendicularly to the path of light emitted from the light emitting element, wherein the phase contrast plate has at least a first region and a second region, and wherein the phase delay of light passing through the first region differs from the phase delay of light passing through the second region.

18. The optical scanner of claim 17 wherein the phase contrast plate is configured to provide an increased working range for the optical scanner.

19. The optical scanner of claim 17 wherein the light emitting element generates a laser beam.

20. The optical scanner of claim 17 wherein the light emitting and focusing elements are configured to generate truncated $J_0$ Bessel beams for scanning distant optical indicia.

21. The optical scanner of claim 4 wherein the phase contrast plate is placed in front of the lens collimator.

\* \* \* \* \*

UNITED STATES PATENT AND TRADEMARK OFFICE
CERTIFICATE OF CORRECTION

PATENT NO.   : 6,092,728
DATED        : July 25, 2000
INVENTOR(S)  : Yajun Li et al.

It is certified that error appears in the above-identified patent and that said Letters Patent is hereby corrected as shown below:

Title page,
Item [56], References Cited, OTHER PUBLICATIONS, "Wild et al." reference, before "vol. 24", insert -- Applied Optics --.
U.S. PATENT DOCUMENTS, the "4,269,473" patent, "Flothman et al." should be -- Flothmann et al. --.
U.S. PATENT DOCUMENTS, the "5,095,194" patent, "235/319" should be -- 235/379 --.
U.S. PATENT DOCUMENTS, the "5,285,438" patent, "Marchand" should be -- Marchand et al. --.
U.S. PATENT DOCUMENTS, the "5,684,290" patent, "Aracklian" should be -- Arackellian --.

Column 6,
Line 15, "base the" should be -- the base --.
Line 16, ":" should be -- . --.

Column 9,
Line 12, after "0.1", insert -- . --.

Column 10,
Line 18, delete "and the".

Column 12,
Line 20, "Wherein" should be -- wherein --.

UNITED STATES PATENT AND TRADEMARK OFFICE
CERTIFICATE OF CORRECTION

PATENT NO. : 6,092,728
DATED : July 25, 2000
INVENTOR(S) : Yajun Li et al.

It is certified that error appears in the above-identified patent and that said Letters Patent is hereby corrected as shown below:

Column 12, (continued)
Line 60, after claim 21, insert the following claims:
    22. A light emitting module for use in a device for reading optically encoded information, comprising:
    a light emitting element;
    a focusing module for focusing light emitted from said light emitting element comprising a lens collimator and a phase contrast plate having a central region and an outer region, wherein said central and outer regions have respective optical transmission coatings such that $\alpha_z - \alpha_o = -\pi$, where $\alpha_z$ is the phase delay of light from the light emitting element passing through the central region and $\alpha_o$ is the phase delay of light from the light emitting element passing through the outer region.

23. The light emitting module of claim 22 wherein the optical coating of the outer region has a transmittance of absolute value less than one.

24. The light emitting module of claim 23 wherein the phase contrast plate is a circular optically flat plate.

Signed and Sealed this

Twenty-second Day of July, 2003

JAMES E. ROGAN
*Director of the United States Patent and Trademark Office*